United States Patent [19]
Chew et al.

[11] Patent Number: 6,106,722
[45] Date of Patent: Aug. 22, 2000

[54] FILTERING PHOTORESIST-CONTAINING LIQUID

[75] Inventors: David H. Chew, Antioch, Calif.; Lyle E. Kirman, Cleveland Heights, Ohio

[73] Assignee: Kinetico Incorporated, Newbury, Ohio

[21] Appl. No.: 08/910,244

[22] Filed: Aug. 12, 1997

[51] Int. Cl.$^7$ .................................................. B01D 61/00
[52] U.S. Cl. ......................... 210/651; 210/652; 210/660; 210/670; 210/681; 210/767; 210/195.2
[58] Field of Search ................................ 210/651, 652, 210/660, 661, 670, 681, 900, 167, 767; 134/10, 11, 102.2

[56] References Cited

U.S. PATENT DOCUMENTS

| | | | |
|---|---|---|---|
| 3,891,552 | 6/1975 | Prior et al. ................................ | 210/87 |
| 4,337,153 | 6/1982 | Prior . | |
| 4,427,549 | 1/1984 | Brown et al. . | |
| 4,764,280 | 8/1988 | Brown et al. . | |
| 4,786,417 | 11/1988 | Miki et al. ................................ | 210/651 |
| 4,863,612 | 9/1989 | Kirman et al. . | |
| 4,889,623 | 12/1989 | Prior et al. . | |
| 4,917,123 | 4/1990 | McConnel et al. ........................ | 134/95 |
| 5,112,491 | 5/1992 | Strantz, Jr. ................................ | 210/651 |
| 5,310,488 | 5/1994 | Hansen et al. . | |
| 5,348,588 | 9/1994 | Winston ..................................... | 134/10 |
| 5,415,765 | 5/1995 | Banham et al. . | |
| 5,543,263 | 8/1996 | Rahman et al. .......................... | 430/168 |
| 5,925,255 | 7/1999 | Mukhopadhyay ....................... | 210/652 |

FOREIGN PATENT DOCUMENTS

| | | |
|---|---|---|
| 53-4777 | 1/1978 | Japan . |
| 59-112890 | 6/1984 | Japan . |

OTHER PUBLICATIONS

PEM Permased Engineering Manual Du Pont Company/Polymer Products Dep, Dec. 1, 1982 Bulletin 203.

*Primary Examiner*—Ana Fortuna
*Attorney, Agent, or Firm*—Watts Hoffmann Fisher & Heinke, Co L.P.A.

[57] ABSTRACT

A method of filtering feed liquid including a photoresist substance comprises removing cations from the feed liquid using an ion exchange material. A fine particle filter filters the feed liquid and, in particular, removes dissolved solids from the feed liquid. The material is regenerated with a solution, e.g., a brine solution, which has a pH effective to avoid fouling of at least one of the filter and the ion exchange material. Another embodiment concerns a filtration apparatus including an ion exchange device containing the ion exchange material. A fine particle filtration device removes dissolved solids from the liquid. A device for regenerating the material includes a supply of the regenerating solution.

32 Claims, 1 Drawing Sheet

FILTERING PHOTORESIST-CONTAINING LIQUID

FIELD OF THE INVENTION

The present invention is directed to filtering photoresist-containing liquid and, in particular, to removing fine particles and dissolved solids from such liquid.

BACKGROUND OF THE INVENTION

Water is used as a rinse in processes that employ photoresist material, such as the fabrication of printed circuit boards and in other industries. A typical sequence in a process for making multilayered circuit boards begins by cleaning and scrubbing a circuit board. Photoresist is applied to the board as a film or liquid. A polymeric photoresist material typically comprises a polymeric film comprised of soluble high boiling point acrylic monomers, fillers, solvents and other adjuvants. The photoresist polymer is photosensitive so that when irradiated with light of the proper wavelength, the polymer becomes soluble in a dilute alkaline solution. The polymer is extremely insoluble in an acidic solution and highly soluble in strongly alkaline solutions. Because of these properties, polymeric photoresist materials are used to cover areas of circuit boards to prevent them from receiving certain coatings.

Light having a certain wavelength (photoimage) is applied to the photoresist to form a photoresist pattern on the board. A developer is then applied and the board is rinsed. A cupric or ammoniacal etchant is applied to remove copper from the board. A stripper then removes the photoresist material and rinse water is applied to the board. The stripper typically may include monoethanolamine, sodium hydroxide and sodium carbonate. The stripper may remove the photoresist polymer in "sheets" and also by converting the polymer to its monomer form. In addition to the soluble monomer, soluble polymer fragments, e.g., 5–7 monomer units long, may be in the rinse. The developer and stripper rinses are subjected to final neutralization and discharged. The etchant material has a high copper content and is treated separately.

Numerous layers having patterned electrodes prepared as above are stacked. The process may include applying an oxide coating, laminating, drilling, deburring and desmearing. Electroless copper plating is conducted. Photoresist material is then applied to the upper and lower surfaces of the stacked patterned layers and subjected to a photoimage. The photoresist is developed and rinse water is applied to the board. Pattern plating applies more copper. The photoresist is stripped and rinsed. A cupric or ammoniacal etchant is applied. A solder strip step is conducted and the board is washed. A solder mask is applied to protect the copper. A developer and rinse water are then applied to the board. Then a solder coat and hot air level occur. The board is then rinsed and dried.

It is difficult to filter the rinse water of the photoresist process. The rinse water contains high concentrations of suspended solids, including photoresist particles. There is also a high biological oxygen demand (BOD) and chemical oxygen demand (COD) from the organic constituents. In view of various contaminants, the rinse water is typically treated for pH adjustment and discharged to a public operated treatment works (POTW). The total volume of rinse water may amount to as much as 40% of the total discharge from manufacturing operations.

SUMMARY OF THE INVENTION

The present invention enables a photoresist-containing feed liquid to be filtered despite the numerous contaminants in the feed liquid. The invention employs a fine particle filter which is not fouled by photoresist polymer or by scale, e.g., $CaCO_3$ scale, and removes much of the total dissolved solids ("TDS") from the feed liquid. An ion exchange material removes hard cations from the feed liquid, thereby reducing scale formation. Also, the ion exchange material is regenerated with a solution, e.g., a brine solution, having a pH that avoids fouling of the filter material and the ion exchange material.

The present invention is generally directed to a method of filtering feed liquid that includes a photoresist substance. The method comprises removing, for example, divalent cations from the feed liquid using an ion exchange material. Fine particles and/or dissolved solids (e.g., soluble monomer and soluble polymer fragments) are removed from the feed liquid using a filter. The cations of the material are regenerated with a solution, e.g., a brine solution, which has a pH effective to avoid fouling of at least one of the ion exchange material and the filter. The pH of the regenerating solution preferably ranges from greater than 7 to about 9.8 and, even more preferably, from about 8 to about 9.8. The brine solution may be either sodium chloride or potassium chloride or a combination thereof.

In particular, the feed liquid may comprise water in particular, a rinse of a developer material and a rinse of a stripper material. The feed liquid is preferably maintained at a pH greater than 7 when the feed liquid passes through the ion exchange material and the filter. A fluid passageway may connect the filter and a device containing the ion exchange material. The feed liquid preferably enters the ion exchange device before entering the filter.

The fine particles are preferably removed by a membrane of the filter. The membrane removes fine particles from the feed liquid preferably less than about 0.01 microns in size and, more preferably, in a range of from about 0.0009 to about 0.008 microns in size.

A preferred embodiment of the present invention comprises removing hard cations from the feed liquid using an ion exchange material. The feed liquid with removed cations is directed to the filter. Dissolved solids and fine particles less than about 0.01 microns in size are removed from the feed liquid with the membrane of the filter. Cations of the material are regenerated With the brine solution. The feed liquid may be processed further or may be directly reused in the system from which it was obtained. Regarding further processing, cations and anions may be removed from the feed liquid after the fine particles have been removed. Alternatively, a reverse osmosis process may be performed on the feed liquid after the fine particles have been removed. Some photoresist material may be removed from the feed liquid by the ion exchange material and most of the remaining photoresist material is removed by the membrane. The feed liquid preferably has a pH ranging from greater than 7 to about 9.8 when it passes through the ion exchange device and the filter.

Another aspect of the present invention is directed to an apparatus comprising an ion exchange device for removing cations from the feed liquid using an ion exchange material. A fine particle filter removes dissolved solids from the feed liquid. A device for regenerating cations of the ion exchange material includes a supply of a solution, e.g., a brine solution, which has a pH that avoids fouling of at least one of the filter and the ion exchange material. The filter preferably includes a membrane having a pore size effective to remove particles from the feed liquid less than about 0.01 microns in size and, more preferably, a pore size effective to remove particles ranging from about 0.0009 to about 0.008 microns in size. The ion exchange device preferably comprises a water softener device.

Many additional features, advantages and a fuller understanding of the invention will be had from the accompanying drawing and the detailed description that follows.

DETAILED DESCRIPTION OF PREFERRED EMBODIMENTS

Figure 1:
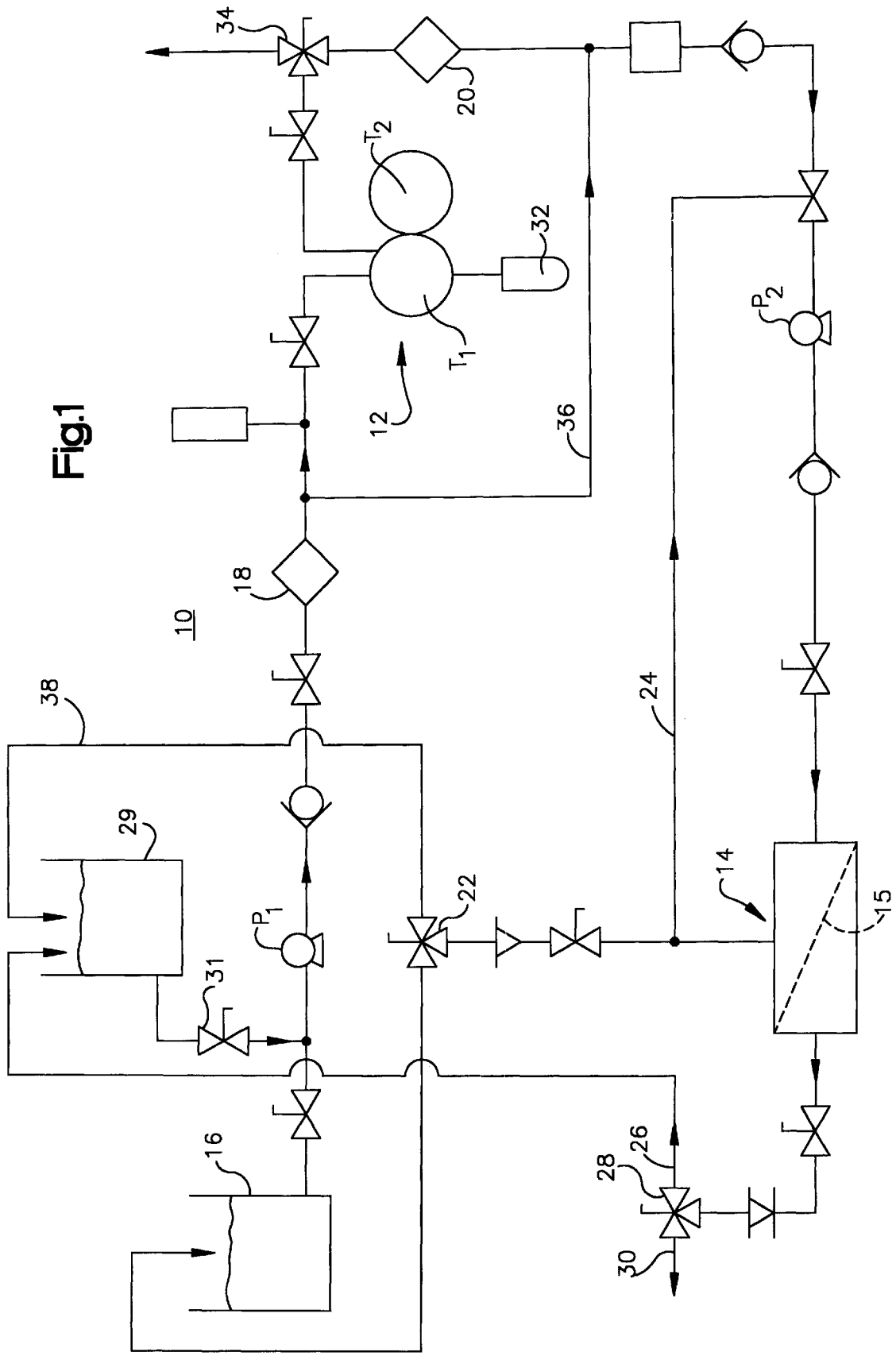
FIG. 1 is a schematic view of a filtration system constructed in accordance with the present invention. The sizes of components of the system are not to scale relative to each other.

Turning now to the drawing, FIG. 1 shows a filtration system constructed in accordance with the present invention generally designated at 10. The filtration system 10 filters feed liquid comprising water, photoresist material, "hardness" cations (positively charged ions such as $Ca^{+2}$ and $Mg^{+2}$) and other contaminants. The system comprises an ion exchange device 12, preferably a water softener, for removing the hardness cations from the liquid and a filter 14 located downstream of the ion exchange device for removing fine particles from the liquid, preferably with a membrane.

The ion exchange device 12 advantageously acts as a prefilter to the fine particle filter 14 and removes some organic material from the feed liquid. An important feature of the ion exchange device of the present invention is its ability to remove hard cations from the feed liquid to avoid fouling of the filter membrane. The pH of the feed liquid is nonacidic to avoid polymerizing monomer in the solution, which may foul the filtration equipment. The soluble monomer and the soluble polymer fragments may be formed by the reaction of the stripper solution and the polymer photoresist material. The pH of the feed liquid is not excessively alkaline, since this results in rapid formation of hydroxide and carbonate compounds (e.g $CaOH$ and $CaCO_3$ scale). As the hardness of the water increases, the pH at which scale forms decreases. The ion exchange device removes hard cations of calcium and magnesium from the feed liquid and prevents the formation of scale in its tank of ion exchange material as well as in the fine particle filter.

Contaminants in the rinse water may include, but are not limited to, carbonate ions, sodium hydroxide, potassium hydroxide, sodium carbonate, potassium carbonate, alkanolamines, acrylates and "hardness" cations. The pH of the rinse water is typically basic as a result of the fabrication process but may be made basic upon addition of a caustic solution, to avoid precipitating the polymer. At this alkaline pH, carbonate ions are removed by the fine particle filter membrane. If a significant amount of calcium ions are present in the rinse water a calcium carbonate scale might form, which would quickly foul the membrane and prevent the system from working. The water softener device unexpectedly operates on the feed liquid without being fouled by the organic and particulate constituents. The water softener removes calcium and other hard ions to a very low concentration, with little or no calcium carbonate scale being formed on the filter membrane and little polymerization (i.e., precipitation) of the monomer.

The range of pH of the feed liquid is an important feature of the present invention. The pH of the feed liquid is above about 7 and, in particular above about 9. At a pH below about 7, the monomer polymerizes. A typical pH of the feed liquid is about 9 to about 9.8. At a pH greater than about 9.8 an excessive amount of scale (e.g., $CaCO_3$) may form. Many factors influence the formation of scale, including the amount of carbonates, hydroxides and hardness (e.g., calcium and magnesium ions) in the water and the pH of the water. Also a factor is the percentage of the filtered feed liquid that is recycled, since when feed liquid to be filtered has already been recycled, the feed liquid will have reduced hardness. Water with very high hardness may form a scale even at a pH of about 9. At a higher pH, the scale may even form in the water softener. The above factors are balanced to empirically determine conditions which are favorable to filtration. The pH range of about 7 to about 9.8 is preferable but may vary depending upon the characteristics of the particular feed liquid.

The ion exchange resin material is one which can be regenerated with a solution (e.g., brine) which avoids fouling of the ion exchange material and, in particular, the filter membrane. The brine preferably has a pH greater than 7 and, even more preferably, a pH ranging from about 8 to about 9.8. A brine solution of aqueous sodium chloride or potassium chloride is preferred. One example of a preferred brine is a 4% aqueous solution of sodium chloride as filled into the ion exchange device.

The ion exchange material is preferably a resin containing sodium or potassium ions that replace hard ions such as calcium and magnesium ions from the feed liquid. The ion exchange device may also remove some polymer and monomer (e.g., acrylates) from the feed liquid. One example of a suitable ion exchange material is Amberlite® 200 brand ion exchange resin by Rohm and Haas. This is a strongly acidic macroporous material. Another example of a suitable material is Amberlite® IR120 brand ion exchange resin by Rohm and Haas. The ion exchange resin material retains sodium or potassium ions in an amount, for example, of about 20,000 to 30,000 grains per cubic toot of resin, for exchange with the hard cations in the feed liquid.

The fine particle filter 14 of the present invention is preferably of a type characterized as a "nanofilter." The filter 14 includes a membrane represented schematically at 15 that has a pore size effective to remove particles less than about 0.01 microns from the feed liquid, more preferably particles in the range of from about 0.0009 to about 0.008 microns in size. The membrane preferably has a "jelly roll" form that facilitates cross-flow or tangential flow filtration as described in the publication, Meltzer, T. H., HIGH PURITY WATER PREPARATION for the Semiconductor, Pharmaceutical and Power Industries, pp. 165–177 (1993), which is incorporated herein by reference in its entirety. One suitable membrane having a jelly roll construction is DK 2540F1073 by Desalination Systems, Inc. Reference may be made to the Meltzer article herein for the particular features of the jelly roll membrane that are suitable for use in the present invention. The filter employs spacers between the rolled layers of the membrane that are typically at least about 25–30 mils in thickness. The spacers are preferably about 50 mils in thickness and may even be about 70 mils or more in thickness. The spacing may vary depending upon the condition of the water and the desired rate and recovery. That is, the 70 mil spacer would enable faster filtration, whereas the 50 mil spacing results in a filter having a greater surface area.

The membrane may be cleaned with a stripper solution comprising monoethanolamine; sodium hydroxide and sodium carbonate. One stripper material is Electro-Brite RS-9001 (40–50% by weight 2-butoxyethanol, 10–20% by weight 2-propoxyethanol, 1–5% by weight sodium hydroxide and furfural alcohol). The membrane cleaning solution is preferably diluted, for example, a 10% aqueous solution.

Examples of dry film photoresist material are Laminar 5000 and Laminar (R) HG by Morton Electronic Materials. Laminar (R) HG is comprised of 25–45% high boiling acrylic monomers, under 1% Michler's ketone and under 0.5% acrylamide. An example of a solder mask is Dynamask® KM brand dry film solder mask by Morton International (10–50% high-boiling acrylic monomers/oligomers, under 5% antimony pentoxide and under 10% talc filler). An example of a developer material is Laminar (R) Developer KB-1A by Morton International (20–30% potassium carbonate).

The fine particle filter removes monomer and polymer (acrylates) from the feed liquid and total dissolved solids ("TDS"). The TDS in the feed liquid is comprised in large part of soluble monomer, soluble polymer fragments, medium molecular weight organics (e.g., 200–300) to high molecular weight organics (e.g., at least 1000), sodium ions, chloride ions, potassium and carbonate ions, sulfates and hydroxide ions. The fine particle filter removes dissolved solids from the feed liquid in the form of, e.g., monomer, polymer fragments, sodium, chlorides, sulfates and carbonates, most suspended particles, e.g., polymer, as well as other organics, e.g., monoethanolamine and alcohol. By the term "suspended particles" herein is meant those particles which do not react chemically in the feed liquid to arrive at their smallest form. On the other hand, for example, the salt sodium chloride is dissolved in the feed liquid to form ions of $Na^+$ and $Cl^-$.

After the feed liquid leaves the fine particle filter it may be treated further by other processes known to those skilled in the art. For example, the liquid may be subjected to a conventional deionization (DI) process. Such a process may have a cation resin which replaces all cations in the liquid with hydrogen ions and an anion resin which replaces all anions of the liquid with hydroxide ions. The feed liquid may be treated by a reverse osmosis (RO) process after leaving the fine particle filter. Additional organics may be removed using activated carbon. The water may also be further treated to remove microorganisms.

Regarding the specific components of the filtration system, the feed liquid may be contained by a feed tank 16. The system may be batch or continuous. FIG. 1 shows lines (e.g., 24) representing pipes connecting the major elements of the filtration system, the types and sizes of which will be apparent to those skilled in the art in view of this disclosure. Other components are also shown such as a variety of two and three way ball valves, ball check valves, conductivity meters and flow meters, which are also known to those skilled in the art. Feed liquid is pumped from the feed tank 16 by a pump $P_1$. The feed liquid is directed through a bag filter 18 for removing large objects from the water (e.g., 50 microns and larger) before it reaches the ion exchange device 12. From the ion exchange device the feed liquid is directed to a cartridge filter 20 for removing particles from the water (e.g., about 25 microns and larger).

The feed liquid is then pumped by a second pump $P_2$, which is preferably operated at a higher pressure than the pump $P_1$, to the fine particle filter 14. Waste water or concentrate leaves the fine particle filter toward a 3-way valve 22. Some water enters a recycle loop 24 and reenters the system. The recycle loop enables a smaller rate of concentrate to be drawn from the fine particle filter along with a higher rate of the recycle stream. Clean water or permeate that passes transversely through the jelly-roll shaped membrane, may be directed along a path 26 by a 3-way valve 28 to a clean-in-place (CIP) tank 29, but normally travels along a path 30. Water traveling along the path 30 may be directly reused as a rinse in the circuit board fabrication process, in other processes that employ photoresist material, or it may be treated further.

When it is desirable or required, the ion exchange resin is subjected to the following regeneration process in countercurrent fashion, i.e., opposite to the direction of filtration. Concentrated brine solution 32 is drawn into the ion exchange device and passes through the resin at a concentration of, for example, about 4 to about 5% in water. Next, water is slowly rinsed through the resin, followed by backwashing water through the resin at a faster rate. Liquids that are used in the regeneration process leave the ion exchange device and are sent via a three way valve 34 to final neutralization. The ion exchange system preferably employs two tanks $T_1$ and $T_2$. One tank is in service or in standby mode while the other is being regenerated.

If it is desired or becomes necessary to clean the fine particle filter 14, the CIP tank 29 containing the cleaning stripper solution, is used. Any suitable materials, e.g., stripper materials, may be used to clean the membrane. Cleaning solution is directed from the CIP tank 29 by a valve 31 into the main filtration line and, after passing the bag filter 18 travels along the bypass path 36. The cleaning solution then passes through the fine particle filter without leaving through the permeate path, passes the recycle line 24, and is directed by the 3-way valve 22 back to the CIP tank 29 along path 38. Alternatively, the cleaning solution may leave via the permeate route and is directed by the 3-way valve 28 back to the CIP tank along the path 26.

The present invention will now be described by way of the following non-limiting example.

EXAMPLE

Feed liquid Having a pH in the range of from about 9 to about 9.8 comprising water, soluble monomer and soluble polymer fragments, hardness ions (e.g., $Ca^{+2}$ and $MS^{+2}$), and other TDS, was treated batchwise by the filtration system shown in FIG. 1. The specific equipment of this example represents, albeit on a smaller scale, a commercial filtration system. Those skilled in the art would appreciate in view of this disclosure that various modifications may be made to the system discussed in this example to increase its scale. For example, larger capacity pumps, a larger water softener and multiple fine particle membranes may be used in a commercial system.

The composition of the feed liquid may vary depending upon the operating parameters of the circuit board fabrication process and the materials used in the process. An example of the make-up of one feed liquid batch is shown by the following Table 1.

TABLE I

| Tank | % of Tank Volume (gal) | Copper (mg/l) | Flow (gal/min) | Rinse Vol (gal/day) | Rinse Load Cu g/day | Water Source |
|---|---|---|---|---|---|---|
| DES Develop | 100 | 0.35 | 20 | 28800 | 39 | City |
| DES Strip | 100 | 0 | 32 | 46080 | 0 | RO |
| Oxide | 200 | 3.03 | 8 | 6720 | 77 | City or RO |

TABLE I-continued

| Tank | % of Tank Volume (gal) | Copper (mg/l) | Flow (gal/min) | Rinse Vol (gal/day) | Rinse Load Cu g/day | Water Source |
|---|---|---|---|---|---|---|
| DPO Develop | 100 | 0.16 | 15 | 21600 | 13 | City |
| Resist Strip | 300 | 0.12 | 25 | 33000 | 15 | RO |
| LPI Develop | 300 | 0.11 | 24 | 31680 | 13 | RO |
| Final Scrub | 100 | 0.01 | 5 | 2400 | 0 | DI |

The term "DES" refers to a develop-etch-and strip machine. The terms "DES Strip" and "DES Develop" refer to the water rinses of each of these materials in interlayer processing. The term "Oxide" refers to the part of the process in which the oxide coating was used. The term "DFO" refers to the outer layer processing and "DFO Develop" and "Resist Strip" are water rinses of each of these materials at this stage of the fabrication process. The term "LPI" means liquid photoimageable and "LPI Develop" refers to the rinse at this stage of the process. The terms "DI" and "RO" mean water obtained from these processes. The term "City" refers to city water.

The feed tank 16 contained about 500 gallons of rinse water. Pump $P_1$ operated at about 10 gallons/minute and about 40–50 pounds/inch$^2$ (psi). The feed liquid passed through the bag filter 18 having dimensions of 4 by 20 inches for removing about 10 or 20 micron ($\mu$m) size particles.

The feed liquid then had organics and hardness ions removed by a Kinetico Model 60 water softener employing Amberlite® IR120 brand ion exchange resin. A dual tank water softener was employed. The brine solution used during regeneration was about a 4 to 5% aqueous sodium chloride solution as filled into the water softener tank. Each regeneration process lasted about 30 to about 45 minutes. Concentrated brine was drawn into the water softener through a venturi. The brine draw step lasted about 15 minutes, the slow rinse lasted about 5 to 7 minutes and in the remaining time the more rapid backwashing step was carried out. Water from regeneration was directed via the three way valve 34 to final neutralization.

After leaving the water softener the feed liquid traveled through a cartridge filter 20. The second pump $P_2$ operated at about 5 gallons/minute and about 80 to about 100 psi. The nanofilter had a 2.5 by 40 inch membrane with 70 mil spacing. The nanofilter was obtained by Desalination Systems, Inc. The concentrate flow was about 0.25 gal/min and the flow into the recycle loop 24 was about 2.75 gal/min. The concentrate was directed back to the CIP tank 29.

The permeate flow was about 2 gals/min and suitable for direct reuse as a rinse in the circuit board fabrication process along the path 30. The filtration system ran for about 6 months, filtering approximately 100,000 gallons of feed liquid. The recycled water is suitable for most aspects of the circuit board fabrication process. However, city water rather than recycled rinse water may be preferred for use as a developer rinse in view of a desired increased hardness the city water has compared to the recycled rinse for this step of the process.

Some typical results of filtration using a system constructed according to the present invention are shown by the following Table II.

TABLE II

| Contaminant | Feed | Post Ion Exchange | Post Fine Particle Filter |
|---|---|---|---|
| Hardness (mg/l as $CaCO_3$) | 154 | 0.5 | 0.03 |
| TDS (mg/l as $CaCO_3$) | 610 | 610 | 185 |
| TOC (mg/l) | 290 | 150 | 79 |
| Copper (mg/l) | 0.10 | 0.05 | 0.02 |

As can be seen from Table II, the water softener removed most of the hardness ions in the water. This prevented fouling of the ion exchange material and the fine particle filter with a scale comprised of, e.g., $CaCO_3$. In fact, the fine particle filter did not require cleaning throughout the entire operation. The TDS was unchanged by the water softener, since it replaced the hard ions with sodium or potassium. The fine particle filter removed substantial amounts of TDS. Over two thirds of the TDS was removed by the fine particle filter. TOC and copper were also reduced by the water softener and the fine particle filter.

Water treated in accordance with the present invention was filtered to about 90% recovery. That is, about 90% of the treated water was suitable for direct reuse in the circuit board fabrication process or for further treatment, while about 10% of the feed liquid was sent to final neutralization and discharge.

Many modifications and variations of the invention will be apparent to those of ordinary skill in the art in light of the foregoing disclosure. Therefore, it is to be understood that, within the scope of the appended claims, the invention can be practiced otherwise than has been specifically shown and described.

What is claimed is:

1. A method of filtering photoresist containing feed liquid comprising soluble monomers, said method comprising the steps of:

removing cations from the feed liquid using an ion exchange material;

filtering the feed liquid using a fine particle filter; and regenerating cations of said ion exchange material with a solution having a pH effective to avoid fouling of at least one of said filter and said ion exchange material.

2. The method of claim 1 wherein dissolved solids are removed by said filter.

3. The method of claim 1 wherein said solution is a brine solution.

4. The method of claim 3 wherein said brine solution comprises one of sodium chloride and potassium chloride.

5. The method of claim 1 comprising removing cations from the feed liquid with said ion exchange material, said cations having a charge greater than +1.

6. The method of claim 1 wherein a membrane of said filter removes fine particles from the feed liquid less than about 0.01 microns in size.

7. The method of claim 1 wherein a membrane of said filter removes fine particles from the feed liquid ranging from about 0.0009 to about 0.008 microns in size.

8. The method of claim 1 wherein the feed liquid comprises water.

9. The method of claim 1 wherein the feed liquid comprises at least one of a rinse of a developer material and a rinse of a stripper material.

10. The method of claim 1 wherein a fluid passageway connects said filter and an ion exchange device which contains said ion exchange material, and the feed liquid enters said ion exchange device before entering said filter.

11. The method of claim 1 comprising maintaining the feed liquid at a pH greater than 7 when the feed liquid passes through said ion exchange material and said filter.

12. The method of claim 1 wherein said solution has a pH ranging from greater than 7 to about 9.8.

13. The method of claim 1 wherein said ion exchange material is a resin containing sodium or potassium ions.

14. The method of claim 1 further comprising maintaining said feed liquid at a pH ranging from 7 to 9.8 when said feed liquid passes through said ion exchange material.

15. The method of claim 1 wherein the feed liquid comprises tap water.

16. The method of claim 1 further comprising maintaining the feed liquid at a pH that is effective to avoid formation of a scale in at least one of the ion exchange material and the fine particle filter and to avoid monomer polymerization.

17. A method of filtering photoresist containing feed liquid comprising soluble monomers, said method comprising the steps of:

removing cations from the feed liquid using an ion exchange material;

directing the feed liquid with removed cations to a filter;

removing dissolved solids and fine particles less than about 0.01 microns in size from the feed liquid with a membrane of said filter; and regenerating cations of said ion exchange material with a brine solution.

18. The method of claim 17 further comprising removing cations and anions from the feed liquid after the fine particles have been removed.

19. The method of claim 17 further comprising conducting a reverse osmosis process on the feed liquid after the fine particles have been removed.

20. The method of claim 17 comprising directly reusing the feed liquid with the fine particles removed in a system from which the feed liquid was obtained.

21. The method of claim 17 comprising removing at least one of calcium and magnesium ions from the feed liquid using said ion exchange material.

22. The method of claim 17 wherein said brine solution has a pH effective to avoid fouling of at least one of said ion exchange material and said membrane.

23. The method of claim 17 wherein said brine solution has a pH ranging from greater than 7 to about 9.8.

24. The method of claim 17 wherein said brine solution comprises one of sodium chloride and potassium chloride.

25. The method of claim 17 wherein said membrane removes fine particles from the feed liquid ranging from about 0.0009 to about 0.008 microns in size.

26. The method of claim 17 comprising removing photoresist particles from the feed liquid using said ion exchange material.

27. The method of claim 17 wherein said dissolved solids comprise photoresist material.

28. The method of claim 17 comprising maintaining the feed liquid at a pH ranging from greater than 7 to about 9.8 when the feed liquid passes through said ion exchange material and said filter.

29. The method of claim 17 wherein said ion exchange material is a resin containing sodium or potassium ions.

30. The method of claim 17 wherein said feed liquid comprises tap water.

31. The method of claim 17 further comprising maintaining the feed liquid at a pH that is effective to avoid formation of a scale in at least one of the ion exchange material and said filter and to avoid monomer polymerization.

32. The method of claim 17 further comprising maintaining said feed liquid at a pH ranging from 7 to 9.8 when said feed liquid passes through said ion exchange material.

\* \* \* \* \*